(12) United States Patent
Nagai et al.

(10) Patent No.: US 7,880,390 B2
(45) Date of Patent: Feb. 1, 2011

(54) VEHICULAR ROOM ILLUMINATING LAMP

(75) Inventors: Kentaro Nagai, Makinohara (JP); Yusuke Nakayama, Fujieda (JP)

(73) Assignee: Yazaki Corporation, Tokyo (JP)

( * ) Notice: Subject to any disclaimer, the term of this patent is extended or adjusted under 35 U.S.C. 154(b) by 294 days.

(21) Appl. No.: 12/203,627

(22) Filed: Sep. 3, 2008

(65) Prior Publication Data

US 2009/0067183 A1  Mar. 12, 2009

(30) Foreign Application Priority Data

Sep. 12, 2007  (JP) .............................. 2007-236642

(51) Int. Cl.
*B60Q 7/00*  (2006.01)
*B60Q 1/14*  (2006.01)

(52) U.S. Cl. .......................................... 315/84; 315/77

(58) Field of Classification Search .................... 315/76, 315/77, 78, 80, 83, 84, 7; 340/7
See application file for complete search history.

(56) References Cited

U.S. PATENT DOCUMENTS 5,304,896 A * 4/1994 Asada et al. .................. 315/84
5,329,204 A * 7/1994 Ricca ........................... 315/82
7,084,570 B2 * 8/2006 Oyaski ......................... 315/82
7,233,111 B2 * 6/2007 Nagai et al. ................... 315/77

FOREIGN PATENT DOCUMENTS

JP  2006-62640  3/2006

* cited by examiner

*Primary Examiner*—Douglas W Owens
*Assistant Examiner*—Minh D A
(74) *Attorney, Agent, or Firm*—Finnegan, Henderson, Farabow, Garrett & Dunner, L.L.P.

(57) ABSTRACT

A vehicular room illuminating lamp includes: a plurality of illumination units applying voltages through courtesy wires thereof to lamps which irradiate positions in a vehicle cabin, the positions corresponding to four doors; a mode switch capable of selecting an all-lights-on mode, a door mode and a light-off mode; and a controller that individually receives a mode selection signal of the mode switch and respective door open/close signals of the four doors. The controller applies the voltages to all of the courtesy wires in the all-lights-on mode, applies the voltage only to the courtesy wire of the illumination unit corresponding to the door indicated to be open by the door open/close signal in the door mode, and does not apply the voltage to any of the courtesy wires irrespective of states of the door open/close signals in the light-off mode.

3 Claims, 13 Drawing Sheets

| MODE SWITCH 14 \ SWITCH SW1~4 | LIGHT-ON MODE | DOOR MODE | |
|---|---|---|---|
| ALL-LIGHTS-ON MODE | ON | ON | |
| DOOR MODE | ON | DOOR : OPEN | DOOR : CLOSE |
| | | ON | OFF |
| LIGHT-OFF MODE | ON | OFF | |

VEHICULAR ROOM ILLUMINATING LAMP

CROSS REFERENCE TO RELATED APPLICATION

This application is based upon and claims the benefit of priority from Japanese Patent Application No. 2007-236642 filed on Sep. 12, 2007, the entire contents of which are incorporated herein by reference.

BACKGROUND OF THE INVENTION

1. Field of the Invention

The present invention relates to a vehicular room illuminating lamp capable of switching a mode between a mode in which a light source can be turned on/off irrespective of an open/close state of a door and a mode in which the light source can be turned on/off in response to the open/close state of the door.

2. Description of the Related Art

Figure 1:
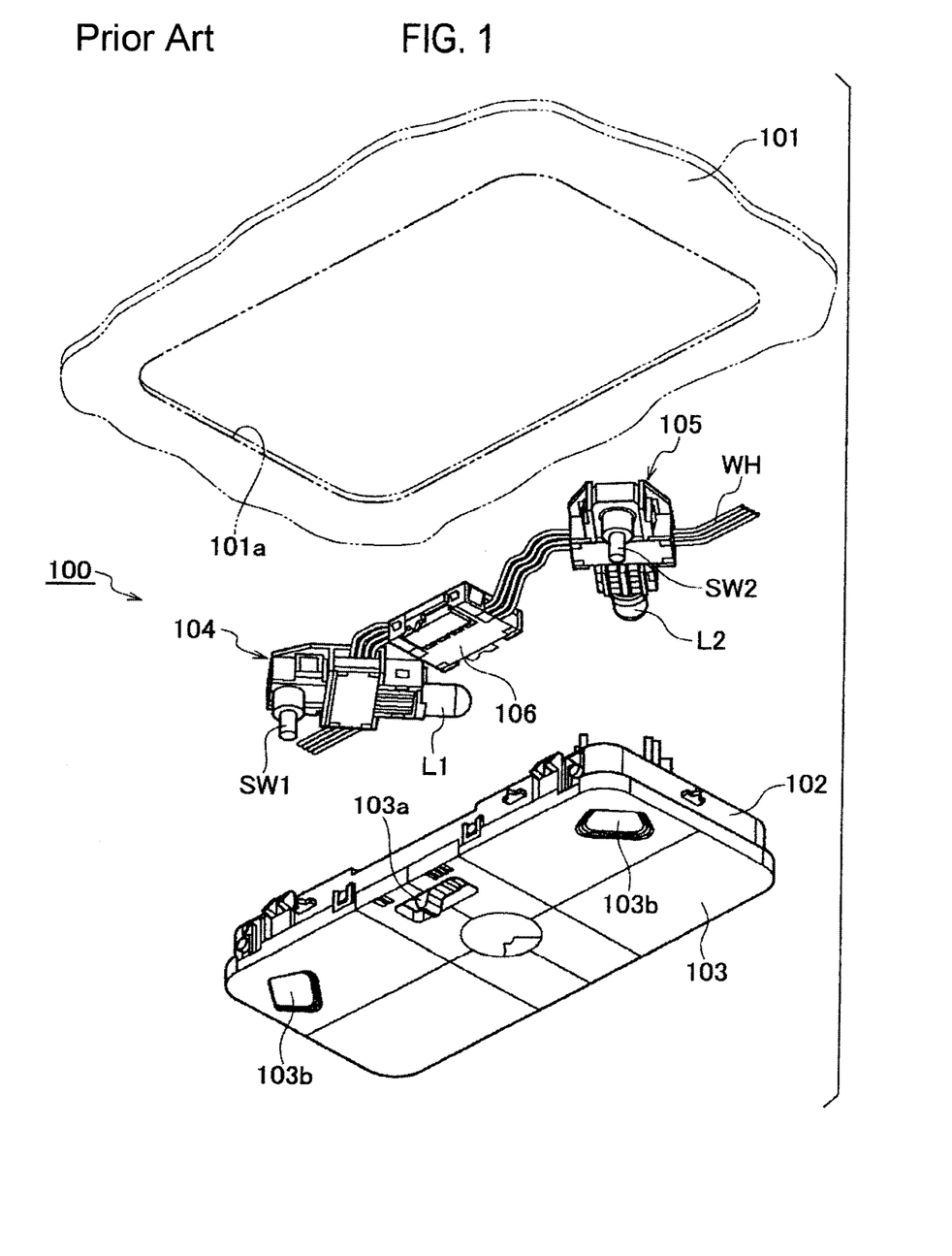
FIG. 1 is a perspective view of a vehicular room illuminating lamp of a conventional example when viewed from a ceiling side.

A conventional vehicular room illuminating lamp is disclosed in Japanese Patent Laid-Open Publication No. 2006-62640. As shown in FIG. 1, this vehicular room illuminating lamp 100 includes: a housing 102; a cover member 103; two illumination units 104 and 105; a mode switch 106; and a wire harness WH in a flat shape. The housing 102 and the cover member 103 are fixed to an indoor ceiling plate 101 by using an opening portion 101a thereof. The illumination units 104 and 105 are mounted into the housing 102. The mode switch 106 is mounted to an inside of the housing 102 and between the two illumination units 104 and 105. The wire harness WH passes through a space among the two illumination units 104 and 105 and the mode switch 106, the space serving as a cabling route.

The two illumination units 104 and 105 are arranged so that respective lamps L1 and L2 can individually irradiate seat positions in a vehicle cabin, which are close to two doors (not shown). The mode switch 106 engages with an operation knob 103a of the cover member 103. The mode switch 106 is adapted to be operable through the operation knob 103a.

The respective illumination units 104 and 105 include switches SW1 and SW2, respectively, together with the lamps L1 and L2 as light sources. The respective switches SW1 and SW2 are protruded to the vehicle cabin side from respective holes 103b and 103b of the cover member 103. The respective switches SW1 and SW2 are adapted to be directly operable. The respective switches SW1 and SW2 are installed at positions where passengers on the seats close to the respective doors (not shown) are capable of operating the switches SW1 and SW2 with ease.

Figure 2:
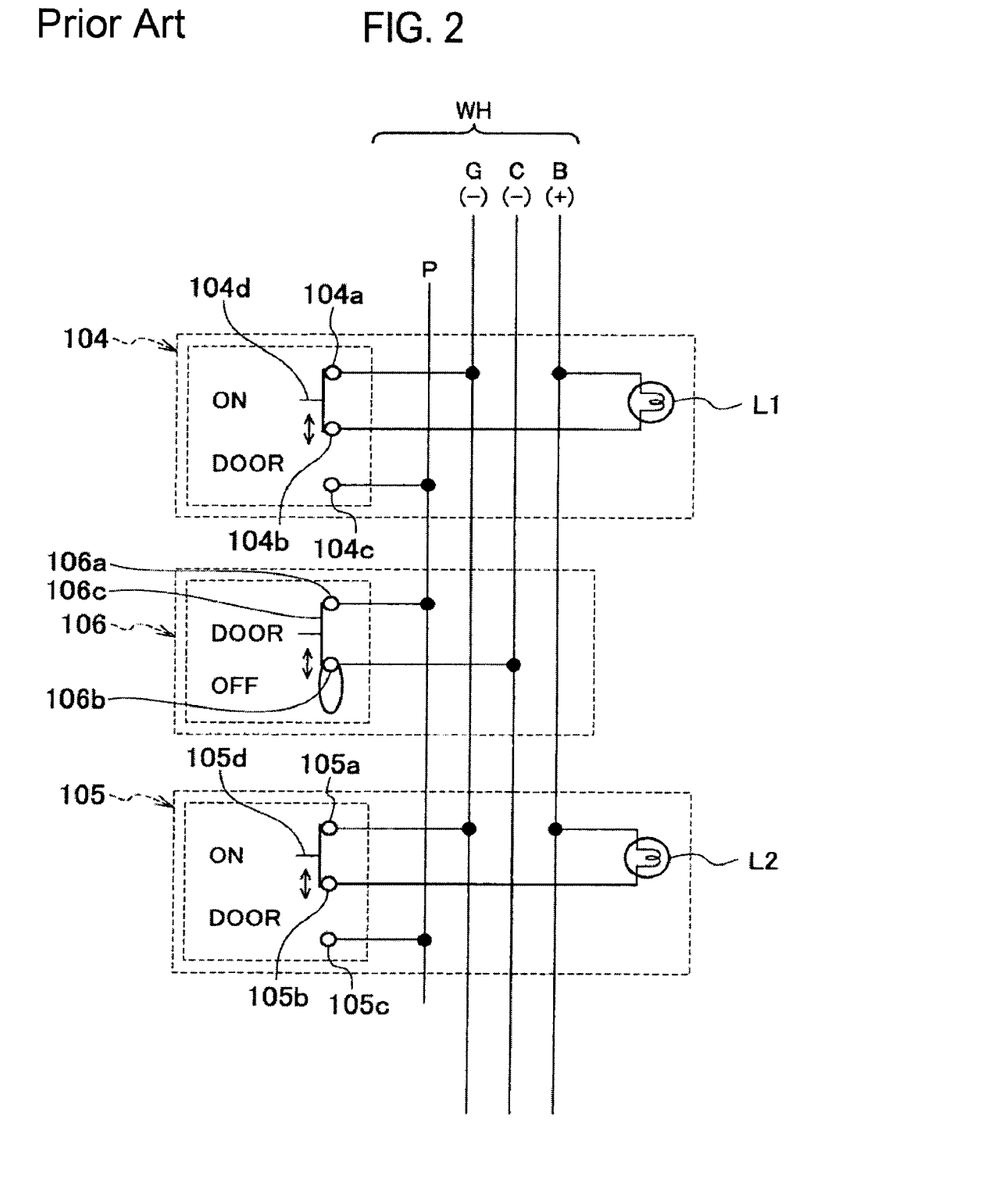
FIG. 2 is a circuit configuration diagram of the vehicular room illuminating lamp of the conventional example.

Next, a description will be made of a circuit configuration of the vehicular room illuminating lamp 100. As shown in FIG. 2, the wire harness WH is composed of a power supply wire B, a ground wire G, a courtesy wire C and a bypass wire P. The power supply wire B is connected to a battery, and the ground wire G is connected to the ground. The courtesy wire C is grounded through a door opening/closing switch unit (not shown). The door opening/closing switch unit is composed so as to ground the courtesy wire C when either one of the two doors is open, and otherwise, to set the courtesy wire C to an open state.

The mode switch 106 includes: two fixed contacts 106a and 106b; and a movable contact 106c that allows the fixed contacts 106a and 106b to conduct/nonconduct with each other. The two fixed contacts 106a and 106b are connected to the power supply wire B and the ground wire G, respectively. The mode switch 106 can switch a mode between a door mode in which the movable contact 106c allows the two fixed contacts 106a and 106b to conduct with each other and a light-off (OFF) mode in which the movable contact 106c allows the two fixed contacts 106a and 106b to nonconduct with each other.

The switch SW1 of the illumination unit 104 includes three fixed contacts 104a, 104b and 104c, and a movable contact 104d that selectively allows two of the fixed contacts to conduct/nonconduct with each other. The switch SW2 of the illumination unit 105 includes three fixed contacts 105a, 105b and 105c, and a movable contact 105d that selectively allows two of the fixed contacts to conduct/nonconduct with each other. The three fixed contacts 104a, 104b and 104c are connected to the ground wire G, the power supply wire B and the bypass wire P, respectively, and the three fixed contacts 105a, 105b and 105c are connected to the ground wire G, the power supply wire B and the bypass wire P, respectively. Switching can be made between a light-on (ON) mode in which the movable contacts 104d and 105d allow the first fixed contacts 104a and 105a and the second fixed contacts 105b and 105b to conduct with each other and the door mode in which the movable contacts 104d and 105d allow the second fixed contacts 104b and 105b and the third fixed contacts 104c and 105c to conduct with each other.

In the above-described configuration, when the ON mode is selected by either of the switches SW1 and SW2, the lamps L1 and L2 of the illumination units 104 and 105 concerned are turned on no matter which of the modes may be selected by the mode switch 106.

When the door mode is selected by the mode switch 106, and the door mode is selected by the two switches SW1 and SW2, the lamps L1 and L2 are turned on under a condition where the doors are open.

When the OFF mode is selected by the mode switch 106, even if the door mode is selected by the two switches SW1 and SW2, the lamps L1 and L2 are not turned on no matter whether or not the doors (not shown) are open.

As described above, in the vehicular room illuminating lamp 100, the respective passengers can select to turn on/off the lamps L1 and L2, and in addition, a driver and the like can select to turn on/off all the lamps L1 and L2 in a lump.

SUMMARY OF THE INVENTION

However, in the above-described conventional vehicular room illuminating lamp 100, when either one of the doors is open when both of the mode switch 106 and the switches SW1 and SW2 are set in the door mode, both of the lamps L1 and L2 of the two illumination units 104 and 105 are turned on. Specifically, the lamp L1 (or L2) of the illumination unit 104 (or 105) that does not correspond to the opened door is also turned on, and accordingly, the battery is consumed wastefully. Moreover, the unnecessary light-on of the lamp L1 or L2 causes an occupant (passenger on the seat that does not correspond to the opened door) to have a disgusting feeling, and comfortableness is impaired.

In this connection, the present invention has been made in order to solve the above-described problem, and it is an object of the present invention to provide a vehicular room illuminating lamp capable of preventing an increase of the wasteful consumption of the battery and the disgusting feeling of the occupant.

An aspect of the present invention is a vehicular room illuminating lamp, which includes: a plurality of illumination units including light sources which are applied with voltages through wires for individual modes and individually irradiate seat positions in a cabin of a vehicle, the seat positions being close to respective doors of the vehicle; a first switch selecting any of an all-lights-on mode, a door mode and a light-off mode; and a controller that receives a mode selection signal of the first switch and door open/close signals of the plurality of doors, applies the voltages to all of the wires for the individual modes when the all-lights-on mode is selected, applies the voltage only to the wire for the individual mode connected to the illumination unit corresponding to the door indicated to be open by the door open/close signal when the door mode is selected, and does not apply the voltage to any of the wires for the individual modes irrespective of states of the door open/close signals when the light-off mode is selected.

In the above-described configuration, the illumination units may include: a first illumination device irradiating a front seat position of the seat positions, the first illumination device being located on a door side of a front seat; and a second illumination device irradiating a rear seat position of the seat positions, the second illumination device being located on a door side of a rear seat.

In the above-described vehicular room illuminating lamp, it is preferable that each of the illumination units is applied by the voltage to the light source through a common wire or the wire for the individual mode and includes a second switch selecting a light-on mode and the door mode. In this case, the light source is preferably applied by the voltage through the common wire when the light-on mode is selected by the second switch, and is preferably applied by the voltage through only the wire for the individual mode when the door mode is selected by the second switch.

According to the present invention, when the door mode is selected by the first switch, the voltage is applied only to the wire for the individual mode connected to the illumination unit corresponding to the door indicated to be open by the door open/close signal. Therefore, only the light source of the illumination unit corresponding to the opened door is turned on. Accordingly, it is possible to prevent the wasteful consumption of the battery, the increase of the disgusting feeling of the occupant, or the deterioration of the comfortableness.

DETAILED DESCRIPTION OF THE EMBODIMENT

A description will be made below of embodiments of the present invention based on the drawings.

Figure 3:
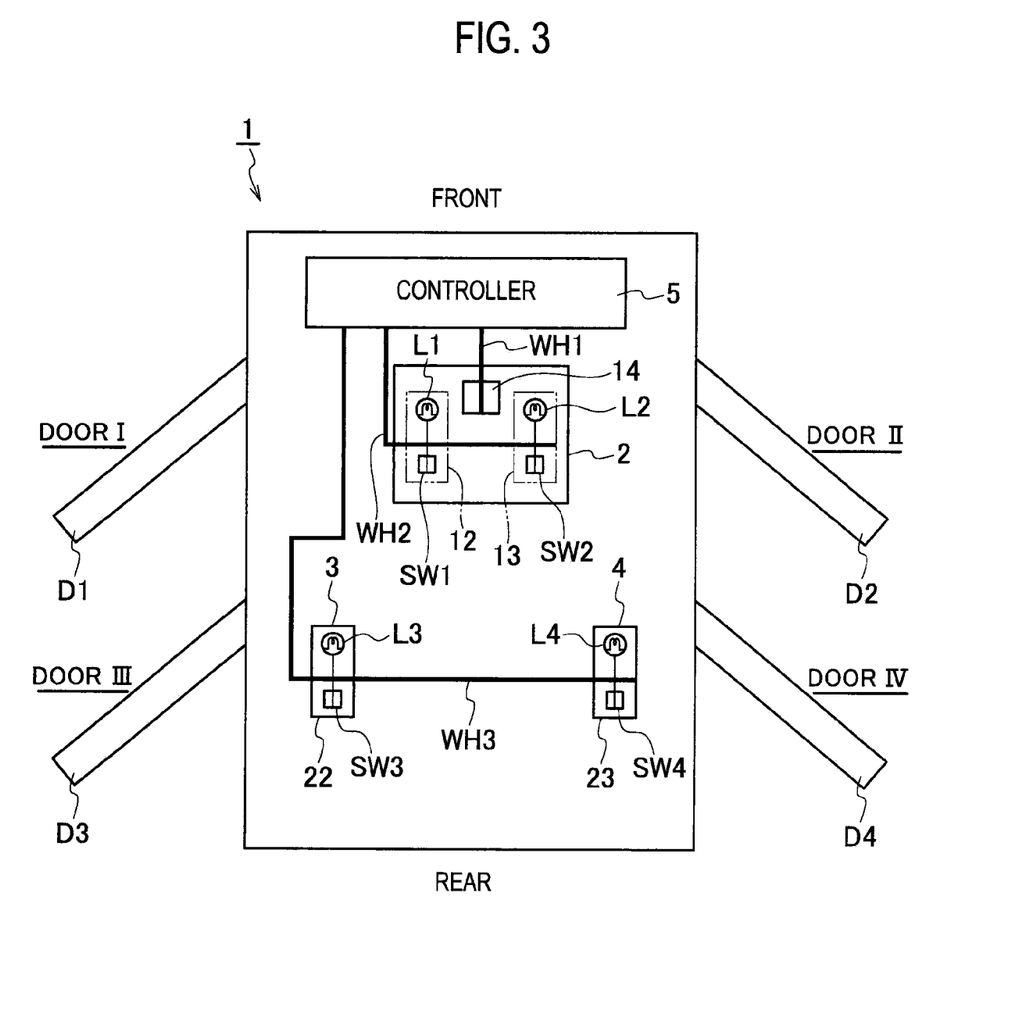
FIG. 3 is a schematic configuration diagram of a vehicular room illuminating lamp, showing an embodiment of the present invention.

As shown in FIG. 3, a vehicular room illuminating lamp 1 includes: a single illuminating device 2 for a map lamp, which is provided on a ceiling on a front seat side of a vehicle cabin; two illuminating devices 3 and 4 for personal lamps, which are provided on a ceiling on a rear seat side of the vehicle cabin; a controller 5 that controls these illuminating devices 2, 3 and 4; a wire harness WH1 for a switching switch and a wire harness WH2 for the map lamp, which are cabled between the illuminating device 2 for a map lamp and the controller 5; and a wire harness WH3 for the personal lamps, which is cabled between the illuminating devices 3 and 4 for the personal lamps and the controller 5.

As shown in FIG. 5 to FIG. 8, the single illuminating device 2 for the map lamp includes: a housing 10 fixed to the ceiling; a cover member 11 that covers a vehicle cabin side of the housing 10; first and second illumination units 12 and 13 as two illuminating means mounted to positions spaced at an interval in the housing 10; and a mode switch (first switch) 14 mounted between the two illumination units 12 and 13 in the housing 10.

The first illumination unit 12 includes: a lamp L1 as a light source; and a switch SW1. The second illumination unit 13 includes: a lamp L2 as a light source; and a switch SW2. The lamp L1 of the first illumination unit 12 irradiates a seat in the vehicle cabin, which is close to a first door D1 for a front seat. The lamp L2 of the second illumination unit 13 irradiates a seat in the vehicle cabin, which is close to a second door D2 for a front seat.

The cover member 11 is made of a transparent member. On a center of the cover member 11, an operation knob 11a that engages with the mode switch 14 is provided. The mode switch 14 is adapted to be operable by operating the operation knob 11a. Moreover, operation portions 11b and 11b which abut on the switches SW1 and SW2 are provided on both sides of the cover member 11, respectively. The respective switches SW1 and SW2 are adapted to be operable by operating the respective operation portions 11b and 11b.

As shown in FIG. 9 to FIG. 12, the illuminating device 3 for the personal lamp includes: a housing 20 fixed to the ceiling; a cover member 21 that covers a vehicle cabin side of the housing 20; and a third illumination unit 22 as illuminating means mounted to the housing 20. The illuminating device 4 for the personal lamp includes: a housing 20 fixed to the ceiling; a cover member 21 that covers a vehicle cabin side of the housing 20; and a fourth illumination unit 23 as illuminating means mounted to the housing 20.

The third illumination unit 22 includes: a lamp L3 as a light source; and a switch (second switch) SW3. The fourth illumination unit 23 includes: a lamp L4 as a light source; and a switch (second switch) SW4. The lamp L3 of the third illumination unit 22 irradiates a position in the vehicle cabin, which corresponds to a third door D3 for the rear seat. The lamp L4 of the fourth illumination unit 23 irradiates a position in the vehicle cabin, which corresponds to a fourth door D4 for the rear seat.

The respective cover members 21 are made of transparent members. Operation portions 21b which abut on the switches SW3 and SW4 are individually provided on the respective cover members 21. The switches SW3 and SW4 are adapted to be operable by operating the respective operation portions 21b.

Figure 4:
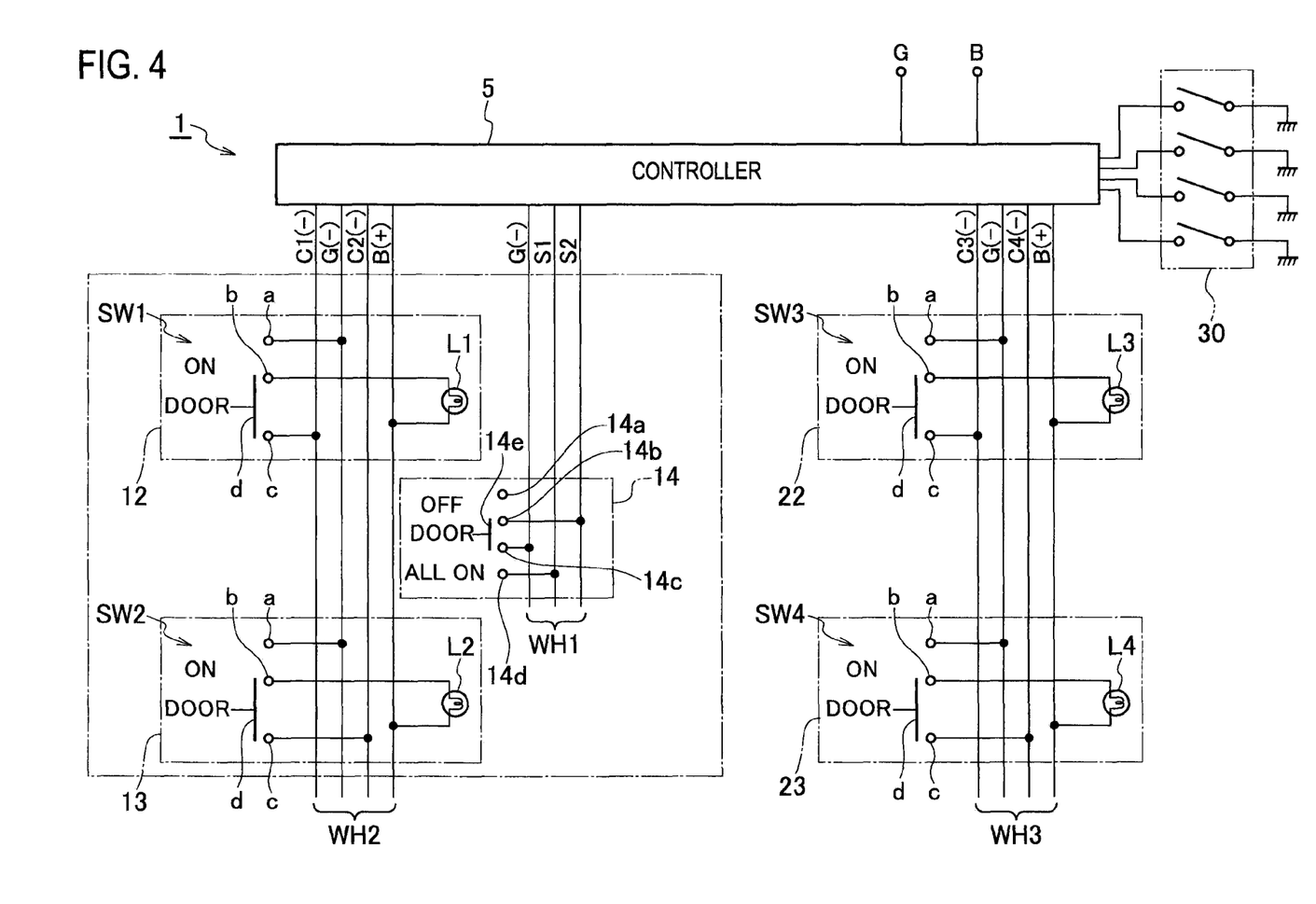
FIG. 4 is a circuit configuration diagram of the vehicular room illuminating lamp, showing the embodiment of the present invention.
Figure 5:
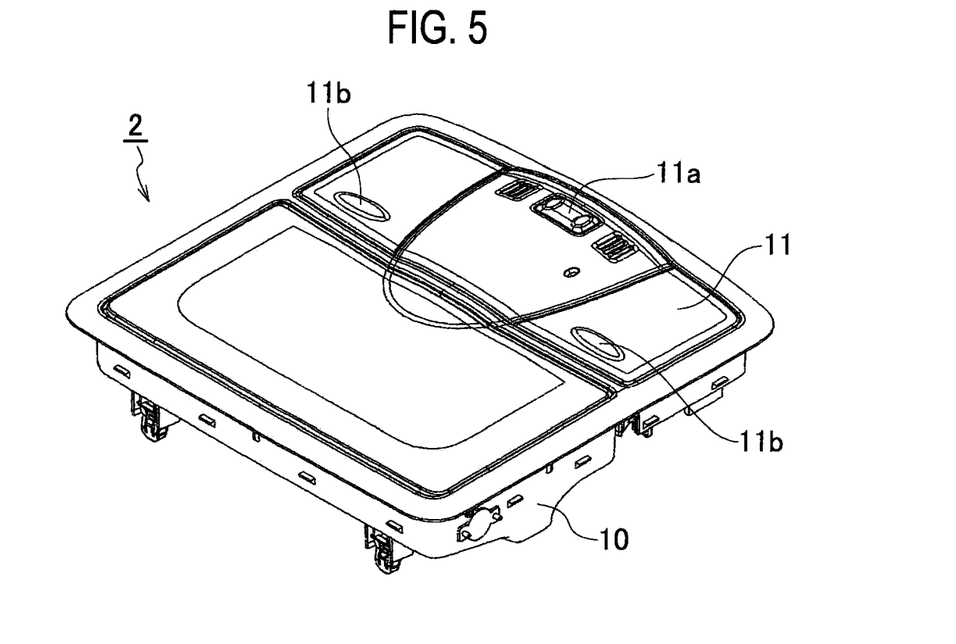
FIG. 5 is a perspective view of an illuminating device for a map lamp when viewed from a cabin inside, showing the embodiment of the present invention.
Figure 6:
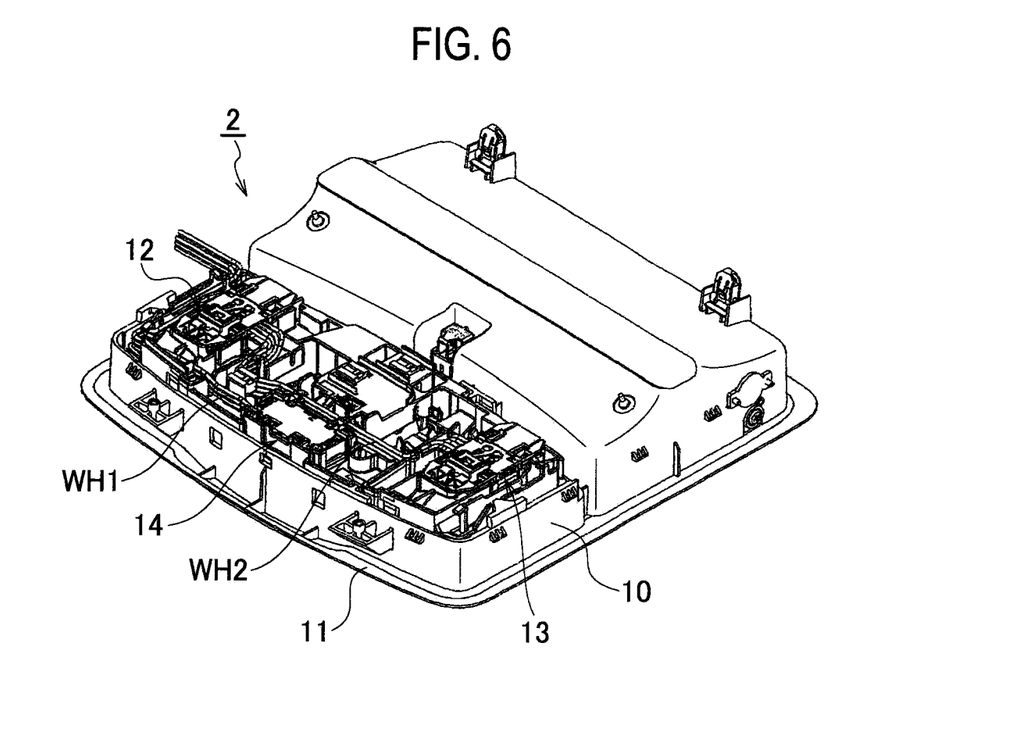
FIG. 6 is perspective view of the illuminating device for the map lamp when viewed from the ceiling side, showing the embodiment of the present invention.
Figure 7:
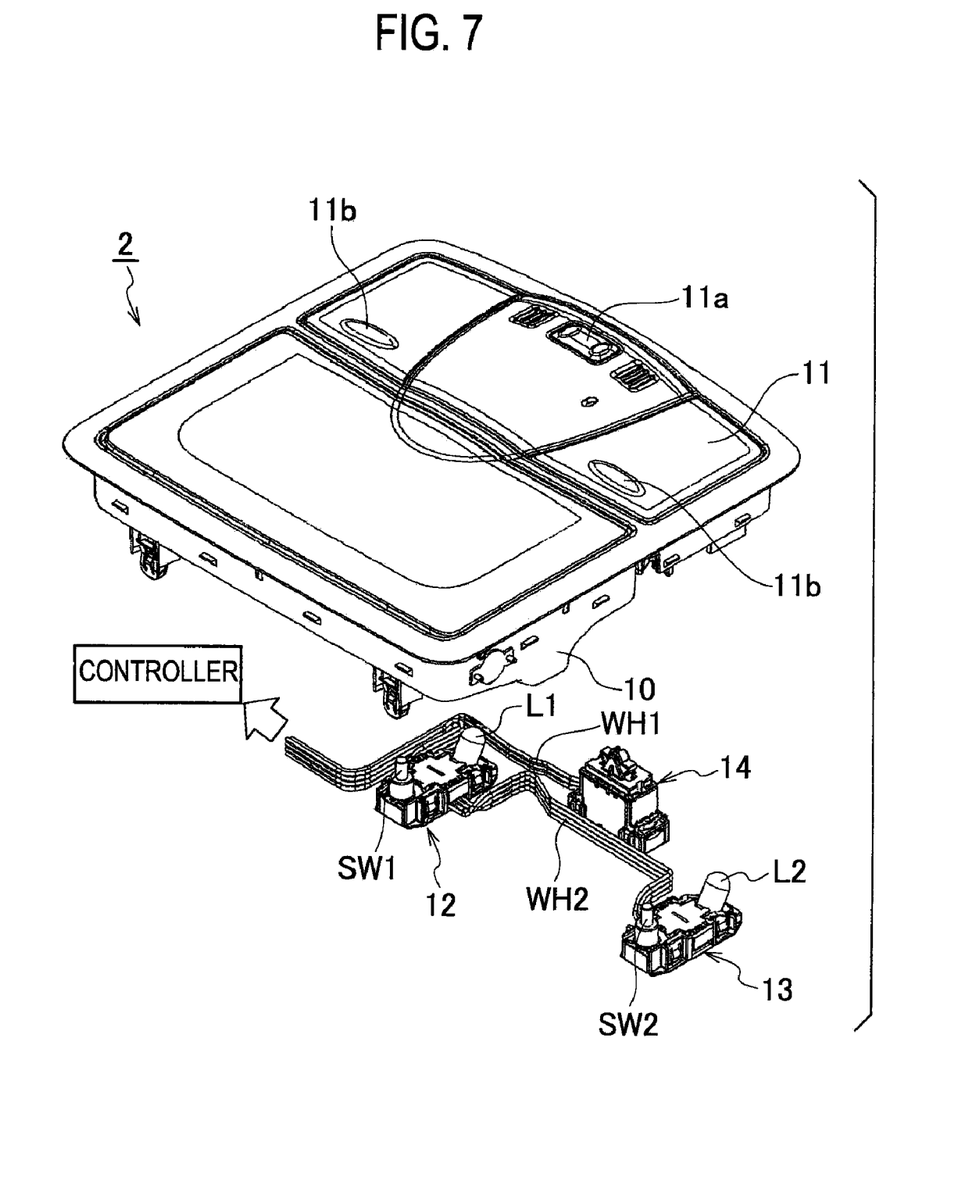
FIG. 7 is an exploded perspective view of the illuminating device for the map lamp when viewed from the cabin inside, showing the embodiment of the present invention.
Figure 8:
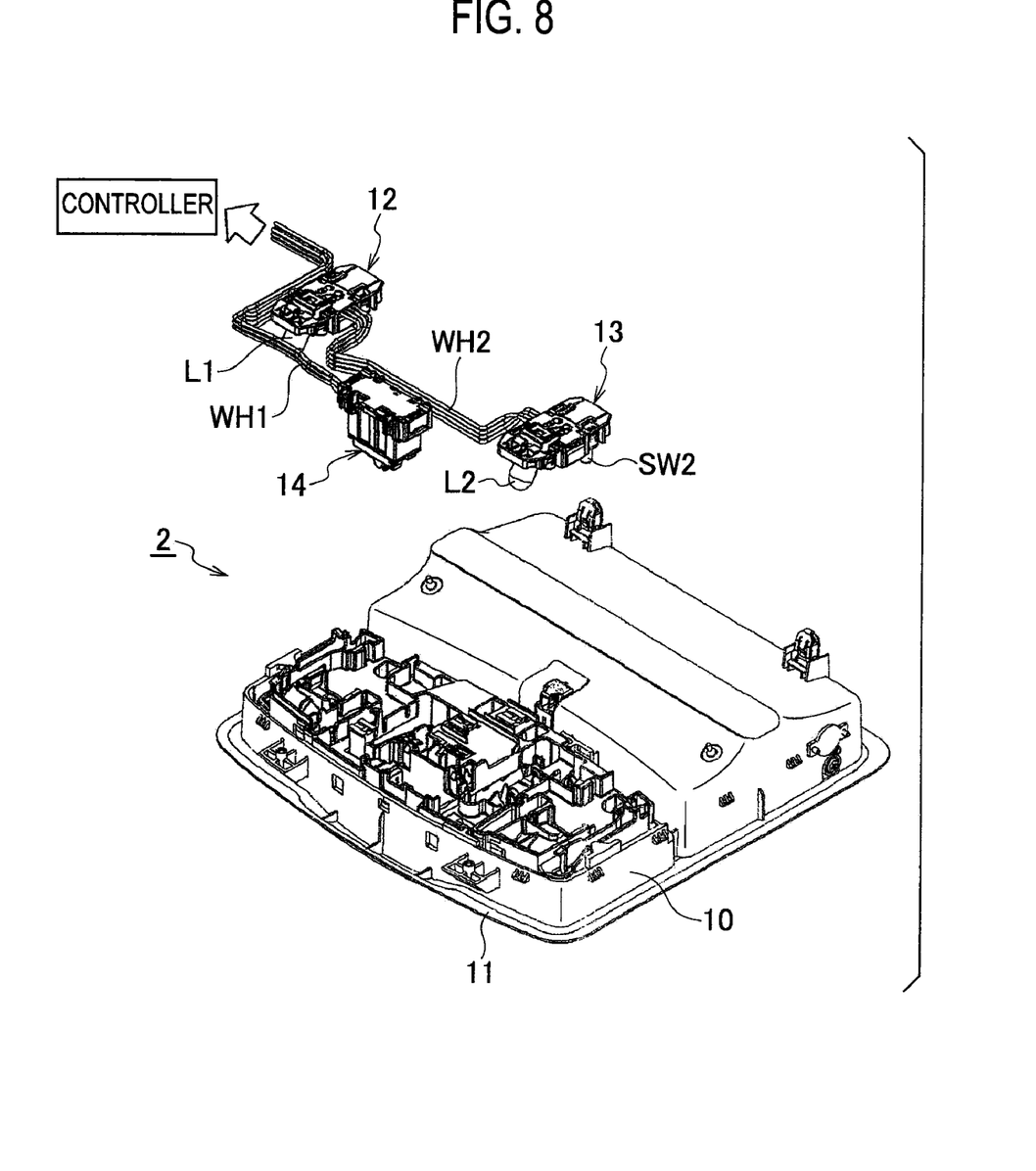
FIG. 8 is an exploded perspective view of the illuminating device for the map lamp when viewed from the ceiling side, showing the embodiment of the present invention.
Figure 9:
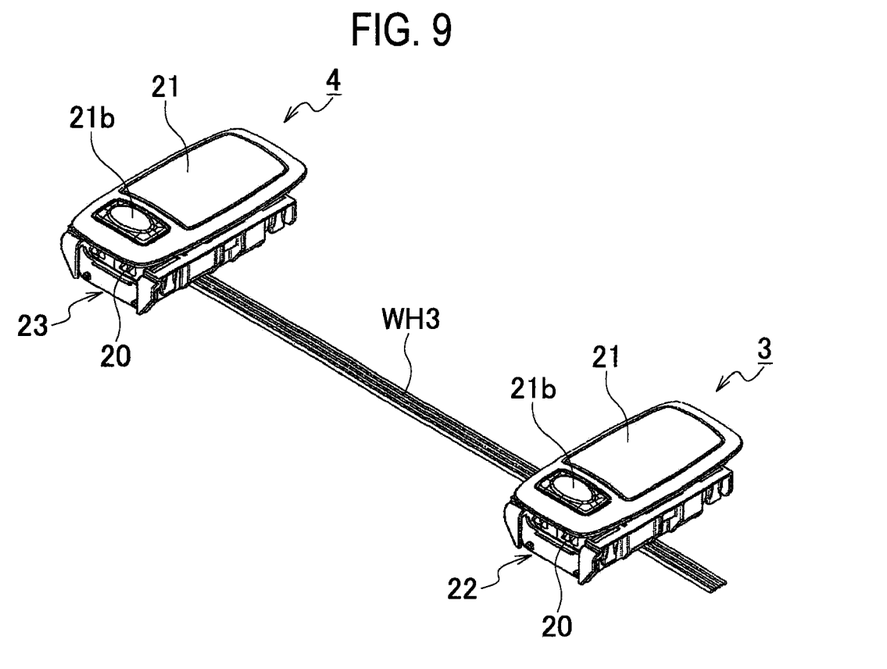
FIG. 9 is a perspective view of illuminating devices for personal lamps when viewed from the cabin inside, showing the embodiment of the present invention.
Figure 10:
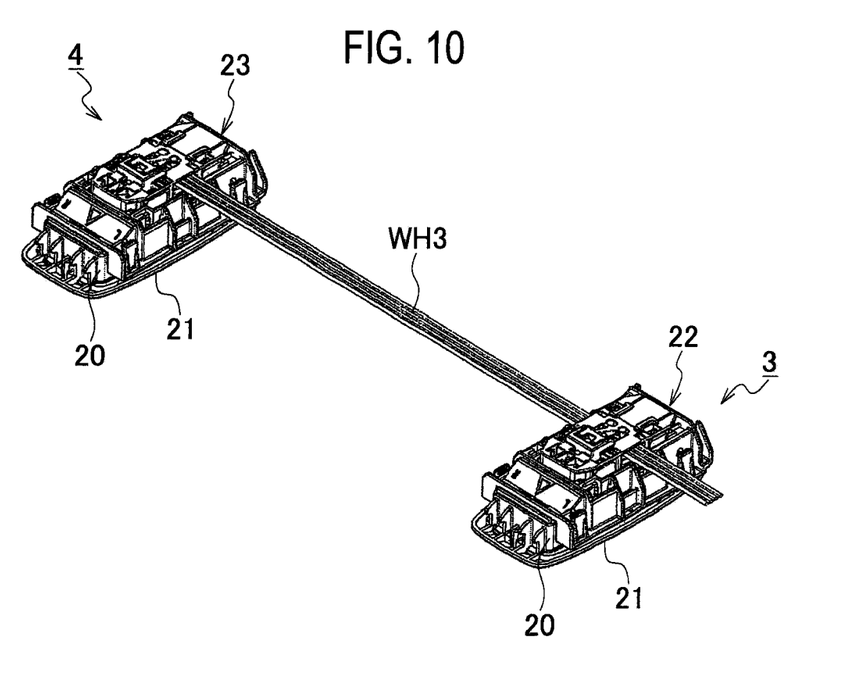
FIG. 10 is a perspective view of the illuminating devices for the personal lamps when viewed from the ceiling side, showing the embodiment of the present invention.
Figure 11:
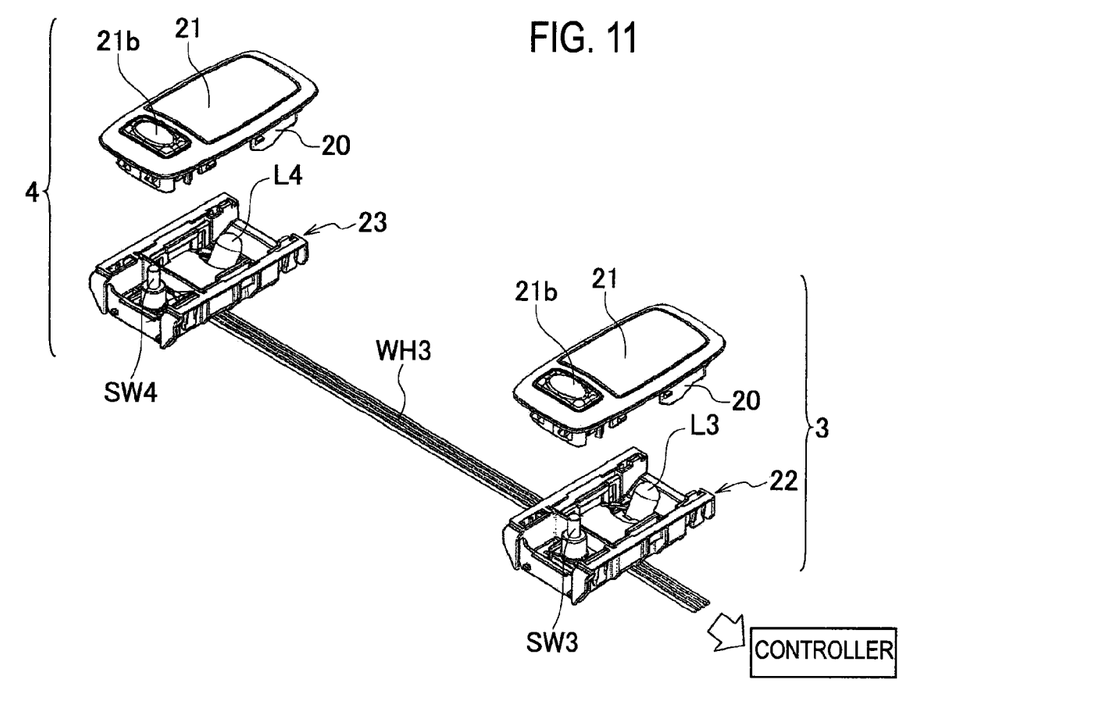
FIG. 11 is an exploded perspective view of the illuminating devices for the personal lamps when viewed from the cabin inside, showing an embodiment of the present invention.
Figure 12:
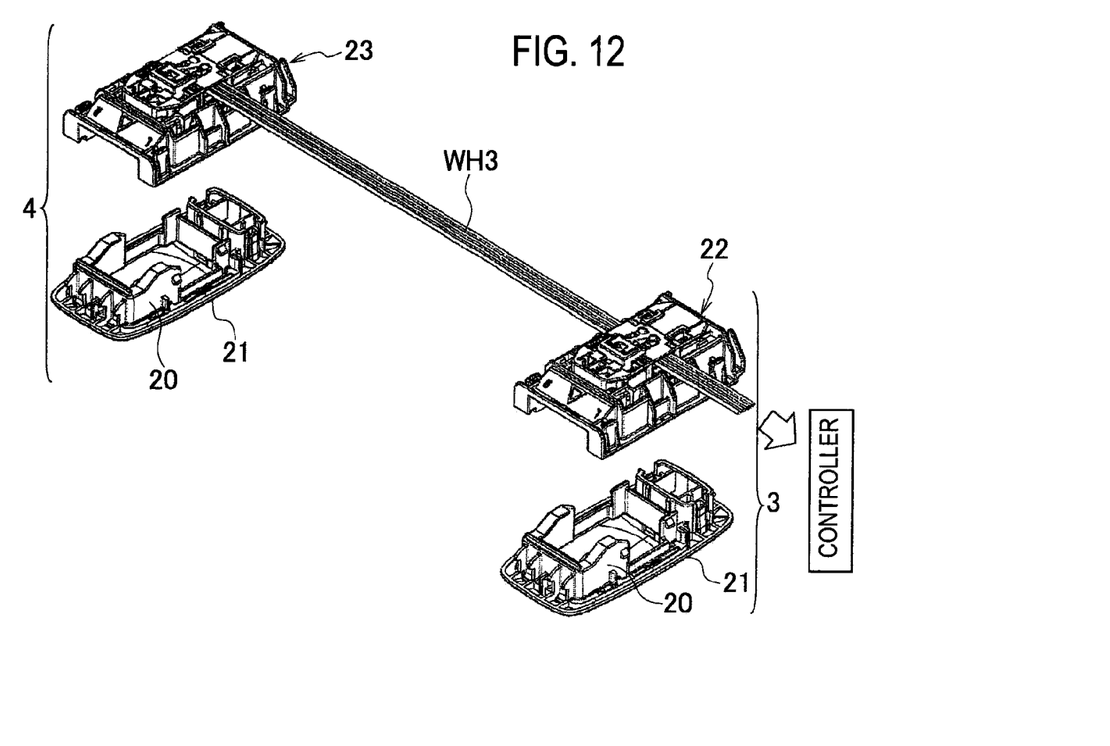
FIG. 12 is an exploded perspective view of the illuminating devices for the personal lamps when viewed from the ceiling side, showing an embodiment of the present invention.

Next, a description will be made of a circuit configuration of the vehicular room illuminating lamp 1. As shown in FIG. 4, the wire harness WH1 for the switching switch has a first control wire S1, a second control wire S2 and a ground wire G. The wire harness WH2 for the map lamp has a power supply wire B and a ground wire G, which are common wires, and a first courtesy wire C1 and a second courtesy wire C2, which are wires for individual modes. The wire harness WH3 for the rear seat has a power supply wire B and a ground wire G, which are common wires, and a third courtesy wire C3 and a fourth courtesy wire C4, which are wires for the individual modes.

The mode switch 14 has first to fourth fixed contacts 14a to 14d, and a movable contact 14e that selectively connects two fixed contacts among them to each other. The first fixed contact 14a is an open contact. The second fixed contact 14b is connected to a second control wire S2. The third fixed contact 14c is connected to the ground wire G. The fourth fixed contact 14d is connected to a first control wire S1. The mode switch 14 switches a mode among a light-off mode, a door mode and an all-lights-on mode. When the movable contact 14e allows the first fixed contact 14a and the second fixed contact 14b to conduct with each other, the light-off mode is set. When the movable contact 14e allows the second fixed contact 14b and the third fixed contact 14c to conduct with each other, the door mode is set. When the movable contact 14e allows the third fixed contact 14c and the fourth fixed contact 14d to conduct with each other, the all-lights-on mode is set.

The switch SW1 of the first illumination unit 12 has first to third fixed contacts a, b and c, and a movable contact d that selectively connects two fixed contacts among them to each other. The first fixed contact a is connected to the ground wire G of the wire harness WH2 for the map lamp. The second fixed contact b is not connected to the wire harness WH2 for the map lamp, but connected to one end side of the lamp L1. The third fixed contact c is connected to the first courtesy wire C1. The switch SW1 can switch a mode between the light-on mode in which the movable contact d allows the first fixed contact a and the second fixed contact b to conduct with each other and the door mode in which the movable contact d allows the second fixed contact b and the third fixed contact c to conduct with each other.

As described above, in the lamp L1 of the first illumination unit 12, the one end thereof is connected to the second fixed contact b, and the other end is connected to the power supply line B.

The second illumination unit 13 has a similar circuit configuration to that of the first illumination unit 12 except that a third fixed contact c of the switch SW2 is connected to the second courtesy wire C2.

The third illumination unit 22 has a similar circuit configuration to that of the first illumination unit 12 except that the unit concerned is connected to the wire harness WH3 for the personal lamp, and that a third fixed contact c of the switch SW3 is connected to the third courtesy wire C3.

The fourth illumination unit 23 has a similar circuit configuration to that of the first illumination unit 12 except that the unit concerned is connected to the wire harness WH3 for the personal lamp, and that a third fixed contact c of the switch SW4 is connected to the fourth courtesy wire C4. Specifically, the switches SW1 to SW4 of the first to fourth illumination units 12, 13, 22 and 23 are energized by the individual courtesy wires C1 to C4, respectively.

To the controller 5, there are inputted a mode selection signal from the mode switch 14 through the wire harness WH1 for the switching switch, and door open/close signals of the respective doors D1 to D4 from a door open/close switch unit 30. Then, in response to the selected mode by the mode switch 14, the controller 5 connects and disconnects the first to fourth courtesy wires C1 to C4 of the wire harness WH2 for the map lamp and the wire harness WH3 for the personal lamps to the ground (common). Specifically, when the all-lights-on mode is selected by the mode switch 14, the controller 5 connects all of the first to fourth courtesy wires C1 to C4 to the ground. When the door mode is selected by the mode switch 14, the controller 5 connects, to the ground, only the courtesy wires C1 to C4 corresponding to the doors D1 to D4 indicated to be open by the door open/close signals. When the light-off mode is selected by the mode switch 14, the controller 5 does not connect any of the courtesy wires C1 to C4 to the ground irrespective of states of the door open/close signals.

Moreover, the ground wires G of the respective wire harnesses WH1, WH2 and WH3 are connected to the ground through the controller 5. The power supply wires B of the respective wire harnesses WH1, WH2 and WH3 are connected to a battery (not shown) through the controller 5. Hence, in a state where a power supply of the vehicle is turned on, voltages are always applied to the respective power supply wires B.

Figure 13:
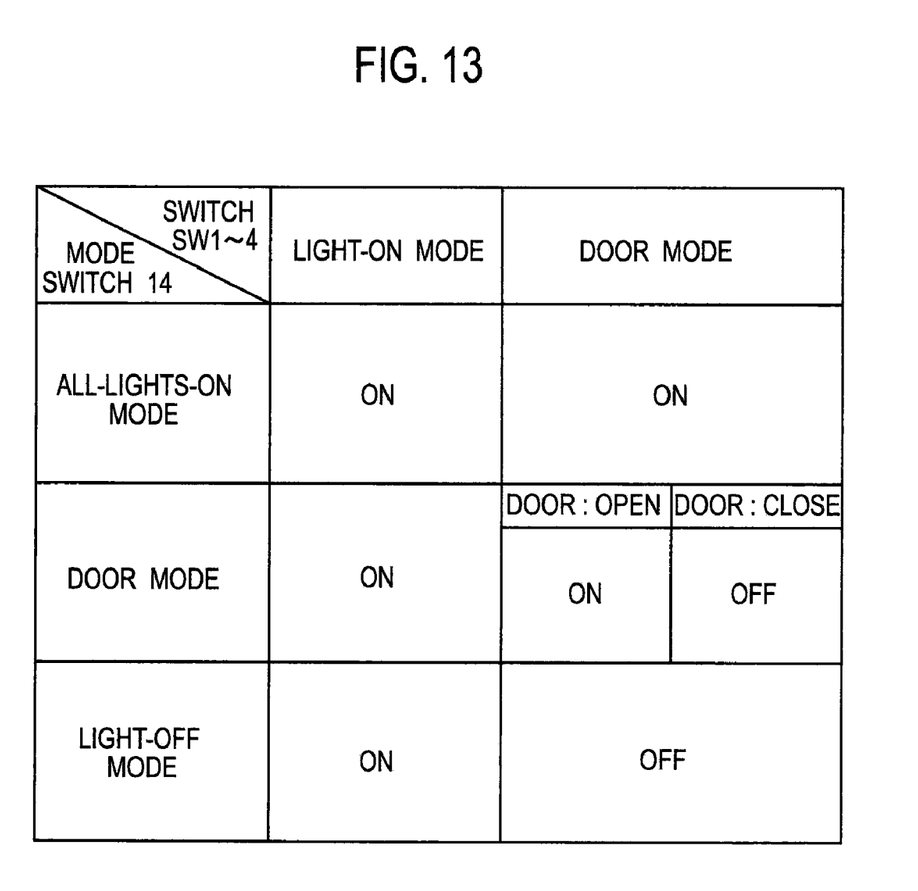
FIG. 13 is a table showing light-on/off states of lamps for each selected mode by a mode switch and switches, showing an embodiment of the present invention.
Figure 14:
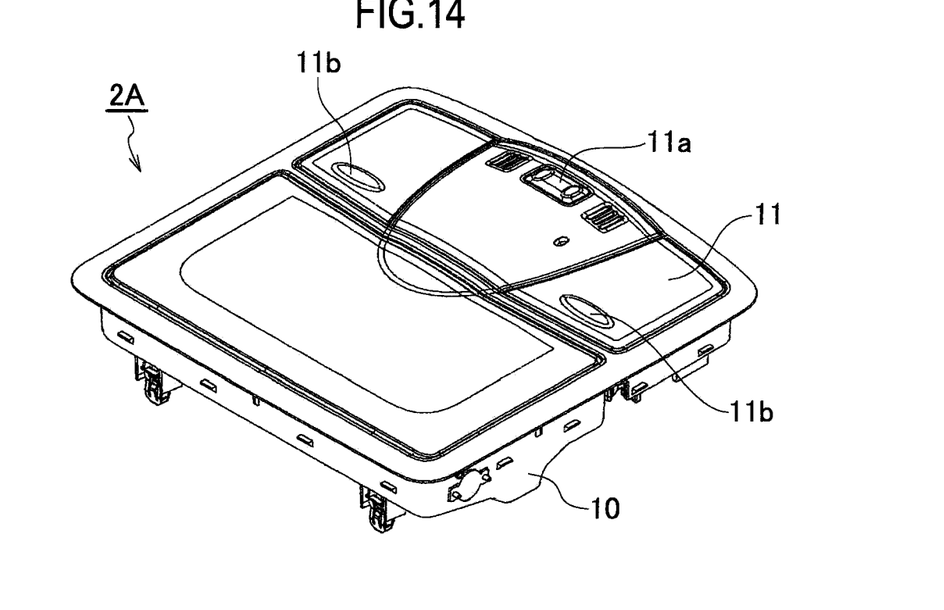
FIG. 14 is a perspective view of an illuminating device for the map lamp, which is according to a modification example when viewed from the cabin inside.
Figure 15:
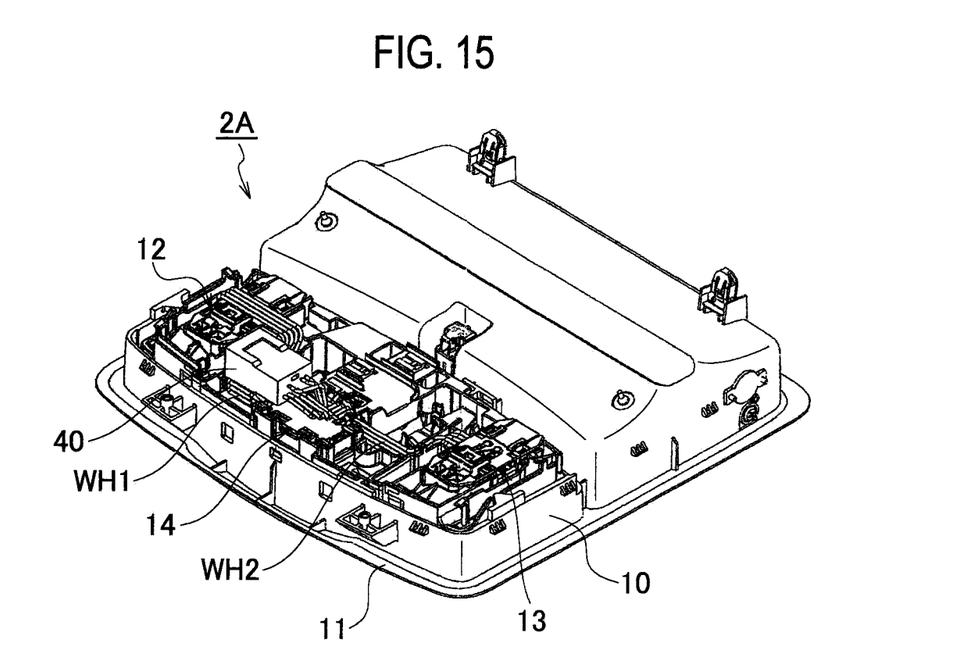
FIG. 15 is a perspective view of the illuminating device for the map lamp, which is according to the modification example when viewed from the ceiling side.
Figure 16:
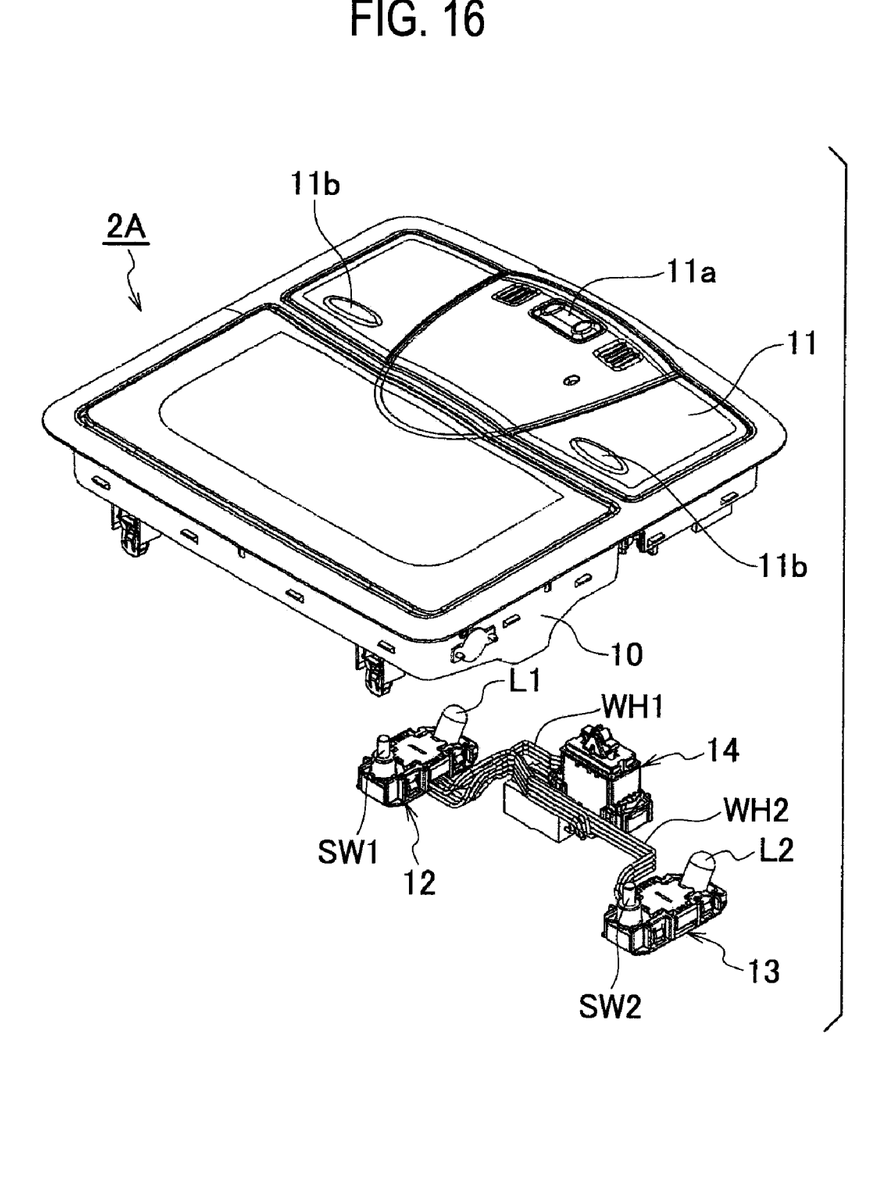
FIG. 16 is an exploded perspective view of the illuminating device for the map lamp, which is according to the modification example when viewed from the cabin inside.
Figure 17:
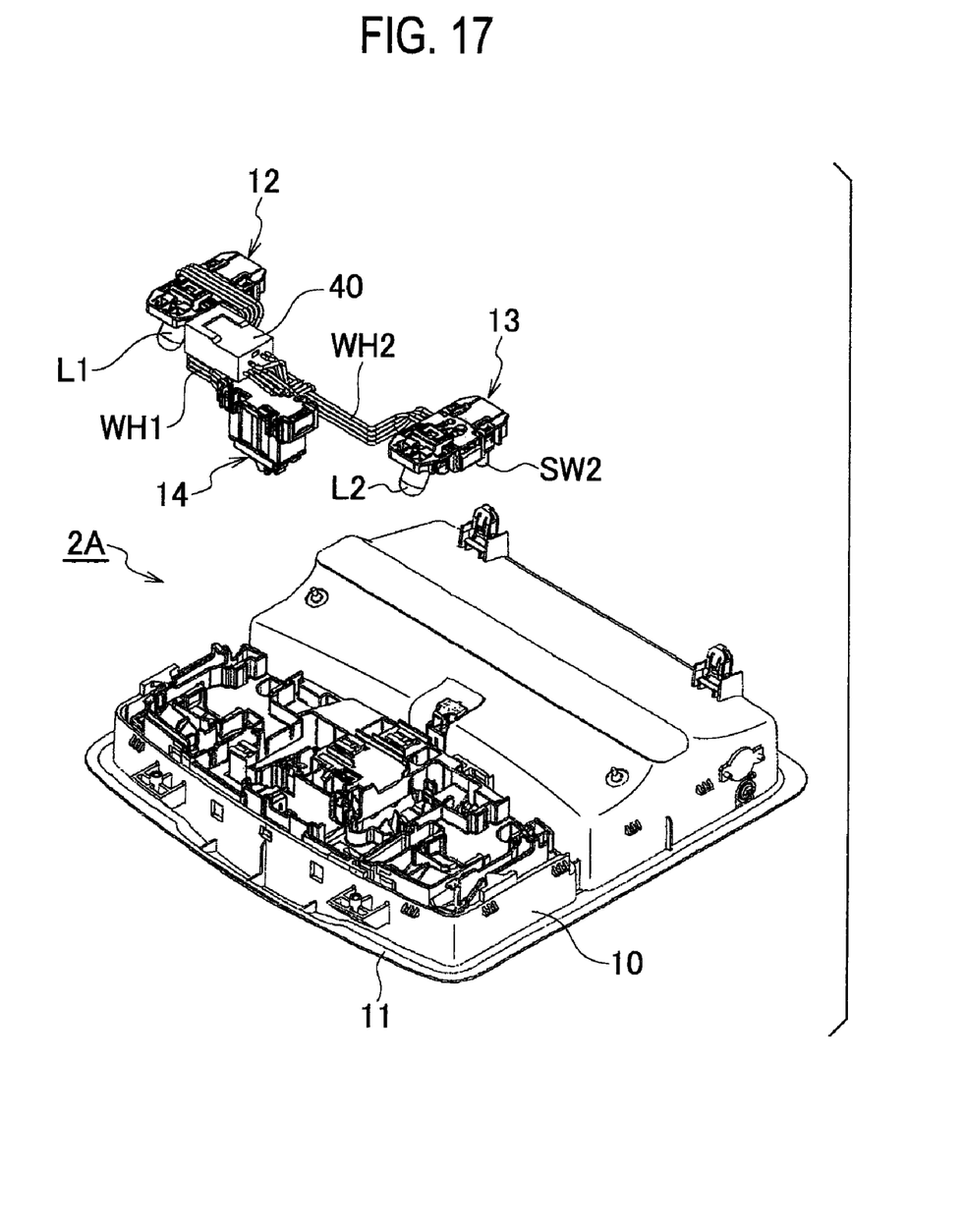
FIG. 17 is an exploded perspective view of the illuminating device for the map lamp, which is according to the modification example when viewed from the ceiling side.

Next, a description will be made of functions of the vehicular room illuminating lamp 1. When the light-off (OFF) mode is selected by the mode switch 14, the controller 5 does not connect any of the courtesy wires C1 to C4 to the ground, but the voltages are applied to the respective power supply wires B. Hence, as shown in FIG. 13, when the light-on mode is selected by an arbitrary one of the switches SW1 to SW4, one of the lamps L1 to L4 of the illumination units 12, 13, 22 and 23 concerned is turned on. Moreover, when the door mode is selected by an arbitrary one of the switches SW1 to SW4, one of the lamps L1 to L4 of the illumination units 12, 13, 22 and 23 concerned is not turned on even if the door is open.

When the door mode is selected by both of the mode switch 14 and the switches SW1 to SW4, the controller 5 checks the states of the door open/close signals of the door open/close switch unit 30. If any one or more of the door open/close signals are ones indicating that the doors are open, then the first to fourth courtesy wires C1 to C4 corresponding to the doors D1 to D4 are selectively connected to the ground.

Hence, as shown in FIG. 13, when the doors are open, only the lamps L1 to L4 of the illumination units 12, 13, 22 and 23 corresponding to the opened doors D1 to D4 are turned on. When the doors are not open, any of the lamps L1 to L4 of the illumination units 12, 13, 22 and 23 is not turned on. For example, when the first door D1 is made open, only the lamp L1 of the first illumination unit 12 is turned on. However, any of the lamps L2 to L4 of the second to fourth illumination units 13, 22 and 23 is not turned on.

When the all-lights-on mode is selected by the mode switch 14, and the door mode is selected by the switches SW1 to SW4, the controller 5 connects all of the first to fourth courtesy wires C1 to C4 to the ground irrespective of the states of the door open/close signals of the door open/close switch unit 30. Hence, all of the lamps L1 to L4 of the illumination units 12, 13, 22 and 23 are turned on. Moreover, when the light-on mode is selected by the switches SW1 to SW4, the lamps L1 to L4 are turned on by being applied with the voltages from the power supply lines B. Specifically, all of the lamps L1 to L4 are turned on irrespective of the selected mode by the switches SW1 to SW4 and irrespective of the open/close states of the doors D1 to D4.

As above, in the vehicular room illuminating lamp 1 according to this embodiment, when the door mode is selected by the mode switch 14, only the courtesy wires C1 to C4 of the illumination units 12, 13, 22 and 23 corresponding to the doors D1 to D4 indicated to be open by the door open/close signals are connected to the ground. Accordingly, only the lamps L1 to L4 of the illumination units 12, 13, 22 and 23 corresponding to the opened doors D1 to D4 are turned on. Hence, it is possible to prevent the wasteful consumption of the battery, the increase of the disgusting feeling of the occupant, or the deterioration of the comfortableness.

In the vehicular room illuminating lamp 1 according to the embodiment, when the door mode is selected by the switches SW1 to SW4, the lamps L1 to L4 are connected to the power supply so as to be energized through only the courtesy wires C1 to C4 corresponding to the respective switches SW1 to SW4. Hence, when the door mode is selected by the mode switch 14, only the lamps L1 to L4 of the illumination units 12, 13, 22 and 23 corresponding to the opened doors D1 to D4 are turned on. Hence, also in the vehicular room illuminating lamp 1 including the mode switch 14 and the switches SW1 to SW4, it is possible to prevent the wasteful consumption of the battery and the deterioration of the disgusting feeling of the occupant.

In the vehicular room illuminating lamp 1 according to the embodiment, with regard to the first to fourth illumination units 12, 13, 22 and 23, those located on the door side of the front seats are included in the illuminating device 2 for the map lamp, and those located on the door side of the rear seat are included in the illuminating devices 3 and 4 for the personal lamps. Hence, when the door mode is selected by the mode switch 14, the lamp L1 or L2 of the illuminating device 2 for the map lamp can be turned on when the door D1 or D2 on the front seat side are made open, and the lamp L3 or L4 of the illuminating devices 3 or 4 for the personal lamps can be turned on when the door D3 or D4 on the rear seat side are made open.

As shown in FIG. 14 to FIG. 17, in comparison with the illuminating device 2 for the map lamp, which is according to the above-mentioned embodiment, an illuminating device 2A for the map lamp, which is according to a modification example of this embodiment, includes a connector 40 to which one end side of the wire harness WH1 for the switching switch and one end side of the wire harness WH2 for the map lamp are connected. Meanwhile, one end of a relay wire harness (not shown) is connected to a controller (not shown) side, and a connector (not shown) is connected to the other end of the relay wire harness. Then, both of the connectors are connected to each other, whereby the illuminating device 2A for the map lamp and the controller are connected to each other. Other configurations are the same as those of the above-mentioned embodiment, and accordingly, a description thereof will be omitted. Note that the same reference numerals are assigned to constituent spots in the drawings, which are the same as those of the above-mentioned embodiment, whereby clarification of the constituent spots is achieved.

Similar functions/effects to those of the above-mentioned embodiment can be obtained even if the illuminating device 2A for the map lamp is applied.

In this modification example, the illuminating device 2A for the map lamp and the controller (not shown) can be individually assembled to the vehicle, and accordingly, good assembling workability is brought.

Note that, in the above-described embodiments, the description has been made of the case where the vehicular room illuminating lamp 1 includes the four illumination units 12, 13, 22 and 23 so as to correspond to the four doors D1 to D4; however, it is a matter of course that the present invention can be applied to such a case where the number of illumination units 12, 13, 22 and 23 is plural.

What is claimed is:

1. A vehicular room illuminating lamp, comprising:
a plurality of illumination units including light sources which are applied with voltages through wires for individual modes and individually irradiate seat positions in a cabin of a vehicle, the seat positions being close to respective doors of the vehicle;
a first switch selecting any of an all-lights-on mode, a door mode and a light-off mode and outputting a mode selection signal; and
a controller that receives the mode selection signal of the first switch and door open/close signals of the plurality of doors, applies the voltages to all of the wires for the individual modes when the all-lights-on mode is selected, applies the voltage only to the wire for the individual mode connected to the illumination unit corresponding to the door indicated to be open by the door open/close signal when the door mode is selected, and does not apply the voltage to any of the wires for the individual modes irrespective of states of the door open/close signals when the light-off mode is selected.

2. The vehicular room illuminating lamp according to claim 1,
wherein, the illumination units include: a first illumination device irradiating a front seat position of the seat positions, the first illumination device being located on a door side of a front seat; and a second illumination device irradiating a rear seat position of the seat positions, the second illumination device being located on a door side of a rear seat.

3. The vehicular room illuminating lamp according to claim 1,
wherein each of the illumination units is applied by the voltage to the light source through a common wire or the wire for the individual mode and includes a second switch selecting a light-on mode and the door mode, and includes a second switch selecting a light-on mode and the door mode,
wherein the light source is applied by the voltage through the common wire when the light-on mode is selected by the second switch, and is applied by the voltage through only the wire for the individual mode when the door mode is selected by the second switch.

* * * * *